(12) United States Patent
Knowles

(10) Patent No.: US 11,228,388 B2
(45) Date of Patent: *Jan. 18, 2022

(54) TIME STAMP REPLICATION WITHIN A WIRELESS NETWORK BASED ON TRANSMISSION PREDICTION

(71) Applicant: Imagination Technologies Limited, Kings Langley (GB)

(72) Inventor: Ian Knowles, Burnham (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/905,808

(22) Filed: Jun. 18, 2020

(65) Prior Publication Data

US 2020/0322076 A1 Oct. 8, 2020

Related U.S. Application Data

(63) Continuation of application No. 15/986,122, filed on May 22, 2018, now Pat. No. 10,721,010, which is a
(Continued)

(51) Int. Cl.
*H04J 3/06* (2006.01)
*H04R 27/00* (2006.01)
*H04W 56/00* (2009.01)

(52) U.S. Cl.
CPC ............ *H04J 3/0673* (2013.01); *H04J 3/065* (2013.01); *H04R 27/00* (2013.01);
(Continued)

(58) Field of Classification Search
CPC ........ H04J 3/065; H04J 3/0664; H04J 3/0673; H04R 27/00; H04R 2227/005; H04R 2420/07; H04W 56/0015; H04W 84/20
See application file for complete search history.

(56) References Cited

U.S. PATENT DOCUMENTS 5,751,721 A   5/1998  Bloks
6,167,048 A * 12/2000  Law ...................... H04J 3/0664
                                                      348/501

(Continued)

FOREIGN PATENT DOCUMENTS

CN    101359238 A    2/2009
CN    102025480 A    4/2011
CN    103283288 A    9/2013

*Primary Examiner* — Asad M Nawaz
*Assistant Examiner* — Kai Chang
(74) *Attorney, Agent, or Firm* — Potomac Law Group, PLLC; Vincent M DeLuca

(57) ABSTRACT

Time stamp replication within wireless networks is described. In an embodiment, a wireless station receives an input time stamp and uses this input time stamp to generate an output time stamp. The wireless station transmits the output time stamp to wireless stations in one of a number of groups which make up the wireless network. The output time stamp is generated to compensate for delays between receiving the input time stamp and transmitting the output time stamp such that output time stamp which is transmitted at a time T corresponds to the value that the input time stamp would have had if it had been received at time T (and not at a time earlier than T). This may, therefore, reduce or eliminate independent time stamp errors and jitter caused by multiple disparate systems and processes.

20 Claims, 8 Drawing Sheets

Related U.S. Application Data continuation of application No. 14/708,461, filed on May 11, 2015, now Pat. No. 10,009,132.

(52) U.S. Cl.
CPC ....... *H04W 56/0015* (2013.01); *H04J 3/0664* (2013.01); *H04R 2227/005* (2013.01); *H04R 2420/07* (2013.01)

(56) References Cited

U.S. PATENT DOCUMENTS

| | | | |
|---|---|---|---|
| 6,532,274 B1* | 3/2003 | Ruffini | H04J 3/0664 375/356 |
| 7,525,484 B2 | 4/2009 | Dupray et al. | |
| 7,860,205 B1 | 12/2010 | Aweya et al. | |
| 7,940,801 B2 | 5/2011 | Gervais et al. | |
| 8,214,447 B2 | 7/2012 | Deslippe et al. | |
| 8,503,596 B2 | 8/2013 | Sheets | |
| 8,559,412 B1 | 10/2013 | Nicholls et al. | |
| 8,930,006 B2 | 1/2015 | Haatainen | |
| 9,173,180 B2 | 10/2015 | Philips et al. | |
| 9,277,256 B2 | 3/2016 | Danielsson et al. | |
| 2003/0142686 A1 | 7/2003 | Kim | |
| 2004/0076187 A1* | 4/2004 | Peled | H04J 3/0685 370/514 |
| 2006/0031556 A1 | 2/2006 | Evans | |
| 2007/0038999 A1 | 2/2007 | Millington | |
| 2007/0226530 A1 | 9/2007 | Celinski et al. | |
| 2008/0080563 A1* | 4/2008 | Kataria | H04J 3/0664 370/503 |
| 2008/0129881 A1 | 6/2008 | Shao et al. | |
| 2009/0204843 A1 | 8/2009 | Celinski et al. | |
| 2009/0298420 A1 | 12/2009 | Haartsen et al. | |
| 2010/0086093 A1 | 4/2010 | Sheet | |
| 2010/0118895 A1* | 5/2010 | Radulescu | H04J 3/0667 370/503 |
| 2010/0166130 A1* | 7/2010 | Rahbar | H04J 3/0664 375/362 |
| 2011/0015769 A1* | 1/2011 | Haatainen | H04J 3/0667 700/94 |
| 2011/0200060 A1 | 8/2011 | Jin | |
| 2011/0216660 A1 | 9/2011 | Lee et al. | |
| 2012/0014377 A1 | 1/2012 | Joergensen et al. | |
| 2012/0082156 A1 | 4/2012 | Swartzentruber et al. | |
| 2012/0155670 A1 | 6/2012 | Rutschman | |
| 2012/0272286 A1 | 10/2012 | Pasternak et al. | |
| 2013/0114601 A1 | 5/2013 | Branscomb | |
| 2013/0128116 A1 | 5/2013 | Knowles | |
| 2014/0092918 A1 | 4/2014 | Jost | |
| 2014/0173432 A1 | 6/2014 | Millington | |
| 2014/0323036 A1 | 10/2014 | Daley et al. | |
| 2015/0071309 A1* | 3/2015 | Aweya | H04J 3/0682 370/503 |
| 2015/0245306 A1 | 8/2015 | Boehlke | |
| 2015/0249967 A1 | 9/2015 | Kaffe et al. | |
| 2016/0360498 A1 | 12/2016 | Knowles | |

\* cited by examiner

TIME STAMP REPLICATION WITHIN A WIRELESS NETWORK BASED ON TRANSMISSION PREDICTION

BACKGROUND

The Wi-Fi™ standard describes a number of different types of management frames. One type is a beacon frame which is used to announce the existence of a network. Beacon frames are transmitted at regular intervals to allow Wi-Fi™ stations to find and identify a network. Beacon frames include a timing synchronization function (TSF) time stamp which is used by receiving wireless stations (STAs) to update a local free running clock.

There are many reasons why time synchronization between Wi-Fi™ stations, or more particularly, synchronization between their local clocks, is important. For example where the Wi-Fi™ network is being used to stream media (e.g. audio or video data) the clocks are used to control play back of the received media. If the local clocks in each of a pair of loudspeakers playing the same music track (e.g. in a multi-room music system) are not synchronized (where each speaker is a separate Wi-Fi™ station), the audio from each speaker will not be synchronized and as the clocks diverge (as one runs faster than the other), this will become audible to a listener. Similarly, where the same music is being played in a multi-room system, if each speaker is not synchronized, this will be audible to a listener as they move from one room to another.

The embodiments described below are not limited to implementations which solve any or all of the disadvantages of known methods of synchronizing Wi-Fi™ stations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Time stamp replication within wireless networks is described. In an embodiment, a wireless station receives an input time stamp and uses this input time stamp to generate an output time stamp. The wireless station transmits the output time stamp to wireless stations in one of a number of groups which make up the wireless network. The output time stamp is generated to compensate for delays between receiving the input time stamp and transmitting the output time stamp such that output time stamp which is transmitted at a time T corresponds to the value that the input time stamp would have had if it had been received at time T (and not at a time earlier than T). This may, therefore, reduce or eliminate independent time stamp errors and jitter caused by multiple disparate systems and processes.

A first aspect provides a method comprising: receiving an input time stamp at a wireless station in a wireless network, the wireless network comprising two or more groups of wireless stations; extracting the input time stamp; generating an output time stamp based on the input time stamp; and transmitting a frame comprising the output time stamp to wireless stations within one of the groups.

A second aspect provides a wireless station comprising: a first communication interface arranged to receive an input time stamp; and a second communication interface arranged to transmit an output time stamp to wireless stations in one of a plurality of groups in a wireless network, wherein the output time stamp is generated based on the input time stamp.

A third aspect provides a wireless network comprising a wireless station as described herein.

A fourth aspect provides a tangible computer readable medium comprising computer program code to configure a computer to perform a method as described herein.

A fifth aspect provides a computer readable storage medium having encoded thereon computer readable program code for generating a processor comprising: a first communication interface arranged to receive an input time stamp; and a second communication interface arranged to transmit an output time stamp to wireless stations in one of a plurality of groups in a wireless network, wherein the output time stamp is generated based on the input time stamp.

A sixth aspect provides a computer readable storage medium having encoded thereon computer readable program code for generating a processor configured to perform the method described herein.

Further aspects provide a method substantially as described with reference to FIG. 3 of the drawings, a wireless station substantially as described with reference to any of FIGS. 2 and 8 of the drawings and a wireless network substantially as described with reference to any of FIGS. 1, 6 and 7 of the drawings.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
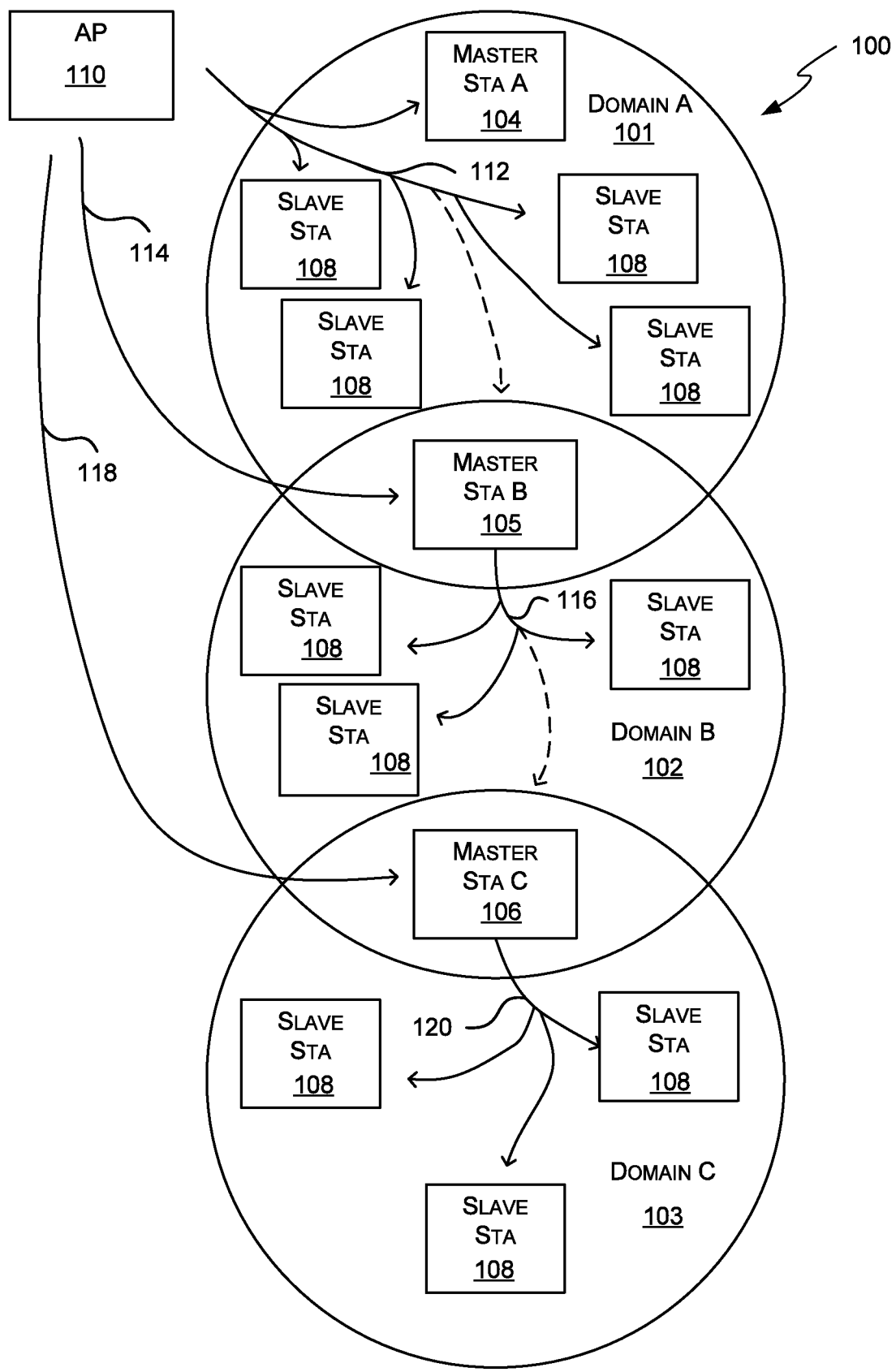
FIG. 1 is a schematic diagram showing an example wireless network.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

In order to synchronize wireless stations (STAs) within a wireless network, one station, which may be an access point (AP), broadcasts frames comprising a time stamp. The time stamp is generated at the broadcasting wireless station and is based on the value of a counter at the broadcasting station which increments based on a free running local oscillator (i.e. an oscillator in the broadcasting wireless station). Wireless stations receiving the frames use the received time stamp to synchronize a local counter (i.e. a counter in the receiving wireless station) which increments based on the "tick" of a free running oscillator (LCO) within the receiving station. Even where all the oscillators in the wireless stations operate at the same nominal rate (e.g. 1 MHz), physical differences in the oscillators mean that their clock rates are slightly different so that even if the counters are aligned initially they do not remain synchronized over long periods of time.

In order to synchronize the counter at a receiving wireless station to the counter of the broadcasting station, each time a time stamp is received by a wireless station it may be used to overwrite the local counter. This limits the synchronization error between wireless stations to the drift in the oscillators between receipt of frames comprising a time stamp. UK Patent GB2494949 describes two different techniques that may be used to improve the synchronization between the transmitting wireless station and the receiving wireless station. In the first technique, prior to overwriting the value of the counter in the receiving station, an error between the received time stamp value and the current value of the counter is calculated. This error can then be used to adjust the rate of the counter in the receiving station (i.e. such that there is not necessarily a fixed relationship between a tick of the local oscillator and an increment of the counter). For example, through knowledge of the time elapsed since a previous correction (e.g. in response to receiving the previous frame), the amount of drift between the AP counter (which corresponds to the value of the time stamp) and the STA counter can be determined. A rate adjustment unit (which may be implemented using a phase locked loop) may then be used to increment the STA counter at a rate much closer to the rate of the AP counter. By repeating this drift determination and adjustment of the rate adjustment unit each time a new time stamp is received, the error tends towards a minimum value over a short period of time. In the second technique described in UK Patent GB2494949, the STA stores a pair of values corresponding to the received counter value and the current value of the STA counter each time a new time stamp is received. Then, instead of rate controlling the STA counter (as in the first technique), the stored pairs of values may be used by higher software layers within the STA to monitor the drift and compensate the STA counter value.

The synchronization methods described above rely upon all the wireless stations in the network being able to receive the frames which contain the original time stamp directly from the broadcasting station (e.g. the AP). If the wireless network is spread over an area which is sufficiently large or has sufficient obstacles blocking wireless transmission, this may not be possible. In examples where all stations cannot receive the frames directly, the wireless stations may be divided into groups or domains, each comprising a subset of the wireless stations, with each group having a master station which generates and broadcasts frames comprising a time stamp. These time stamps are independently generated by each master station and may start at different values and/or increment at different rates such that there is no time synchronization between groups and each effectively operates as its own network. This means that in applications where the time stamp is used for a common decode process, for example to decode data (such as an audio stream) to which time stamps have been added by a master wireless station, the data (e.g. the data with added time stamps) cannot be reused in multiple groups and instead time stamps must be added to the data within each group and the resultant data distributed separately within the group. This is inefficient as it wastes processing power (e.g. through the duplicated effort of generating the time stamped data) and potentially also bandwidth within the wireless network (e.g. through the distribution of multiple time stamped data streams). Furthermore, if two or more groups are using the same or overlapping wireless channels, having multiple copies of the same streaming data (e.g. with each copy having different added time stamps) results in competition for channel bandwidth.

Methods of time stamp replication within a wireless network are described herein which enable the same time stamped data to be used in multiple wireless groups/domains. The methods described herein notionally join groups of wireless stations to a single time, even though each group runs with a different timing clock. The methods involve replication of time stamps within a wireless station which comprises two communication interfaces and which may operate as an AP or as a master within a domain (e.g. a P2P Group Owner within a Wi-Fi™ Direct system) and broadcast frames comprising a time stamp. The wireless station receives a time stamp in a frame on a first interface (e.g. from an AP or other master) and replicates and broadcasts the time stamp in a frame on a second interface to other wireless stations in the domain in which it is AP/master. The two interfaces may use the same wireless protocol and frequency or they may use different protocols/frequencies (of which at least the second protocol is a wireless protocol). In some examples, the same physical interface (e.g. the same Wi-Fi™ module) may act as both interfaces and may use time division multiplexing to switch between receiving a frame comprising a time stamp and re-broadcasting a time stamp in a frame. In this way, the wireless station acts as a bridge, replicating and re-broadcasting a time stamp to another group of devices.

The re-broadcast time stamp may have the same value as the received time stamp; however, in many examples, the wireless station includes a time stamp correction module which adjusts the value of the time stamp which is broadcast (such that it is not the same value as the received time stamp) to account for any delays within the wireless station (e.g. due to the network stack and processing). The time stamp correction module predicts the value of the time stamp at the receiver at the time that a frame is broadcast. In such an example, the replicated and re-broadcast time stamp ($TS_{out}$) has the value that the received time stamp ($TS_{in}$) would have had if the receipt and re-broadcasting of time stamps occurred at exactly the same time, i.e. $TS_{out}=TS_{in}+\Delta TS$, where $\Delta TS$ is the amount by which the counter at the station generating the original time stamp increments in the time between receipt of the time stamp and re-broadcast of the time stamp at the re-broadcasting station.

By re-broadcasting a corrected time stamp in this way, all the frames broadcast by APs/masters within a wireless network (and across multiple groups/domains within that network) comprise synchronized time stamps (i.e. the time stamps are unified across all domains) and wireless stations in different domains are all synchronized even though not all wireless stations are directly receiving frames comprising time stamps from the same station. All the domains may therefore be described as being in the same time zone and the time stamps may be described as being in lock-step across all domains. This synchronization of time stamps across all domains enables data (e.g. time stamped audio data) to be re-used across multiple domains (with the same accuracy) and also means that the data may be generated in a different domain to the domain in which the original time stamp is generated (without any loss of accuracy where data is shared between domains). Additionally, reconfiguration of the wireless network is quicker and easier as wireless stations which are moved from one domain to another domain do not need to synchronize themselves to the time in the new domain. Where the wireless stations are portable devices (e.g. wireless speakers), a user may periodically re-arrange the devices around their home (e.g. to re-position the wireless speakers for different occasions such as parties inside, parties outside, etc.). The methods described herein may also be used across a number of wireless networks, such that the wireless stations in the different networks are all synchronized even though they are receiving frames comprising time stamps from different master stations.

Wireless networks using the methods described herein may be described as "self-healing" because of the ease with which a wireless station can change domains (e.g. due to re-positioning or failure of a master device). In various examples, the network may be re-configured dynamically (e.g. during audio playback), such that a user can pick up a wireless speaker and move it from one room to another and the speaker can seamlessly switch from one domain to another and continue to play back the audio as long as it continues to receive time stamp frames from a broadcasting wireless station and the audio stream from the same or a different wireless station. In another example scenario, a system master may become overloaded (e.g. due to the CPU being utilized for other tasks) and so slave stations may be moved over to a new master seamlessly as all the clocks are synchronized.

In various examples, the different domains which are synchronized using the methods described herein may operate on different physical channels, where these channels may be within the same frequency band (e.g. within the 2.4 GHz or 5 GHz bands) or within different frequency bands (e.g. one channel in the 2.4 GHz band and one channel in the 5 GHz band). In an example scenario there may be a first wireless network operating at 2.4 GHz and a second wireless network operating at 5 GHz. If the 2.4 GHz band becomes impossible to use (e.g. due to microwave or other interference), wireless stations operating in the 2.4 GHz network may self-heal and switch to the 5 GHz network and still maintain clock accuracy due to the time stamp replication methods described herein being used to synchronize the time between the two wireless networks.

The self-healing nature of the networks which use the methods described herein to synchronize time stamps may also be used in combination with a module within the network that selects the best wireless station to act as time keeper (and hence broadcast the original time stamps which are then replicated by other masters). This selection may, for example, be performed dynamically such that the time keeper wireless station may change as the network fluctuates (e.g. in both accuracy and range).

Although many of the examples described herein relate to playing back audio data, the methods may be used for media data, control data, etc. For example, the methods may be used in any application that requires synchronization across an extended area (e.g. such that there are two or more domains), e.g. in the fields of process control, manufacturing, scientific instrumentation, etc.

The term "Wi-Fi™ network" is used herein to mean a wireless local area network that is based on the Institute of Electrical and Electronics Engineers (IEEE) 802.11 standards. The term "Wi-Fi™ station" is used herein to mean an electronic device that has a Wi-Fi™ module that allows the device to exchange data wirelessly using the IEEE 802.11 standards. The term "Wi-Fi™ access point" is used herein to mean an electronic device that acts as a central transmitter and receiver of W-Fi™ signals as set out in the IEEE 802.11 standards.

Although the methods and systems are described herein as being used in a Wi-Fi™ network (e.g. for Wi-Fi™ groups), it will be appreciated that the methods may also be applied in other wireless networks which use some form of synchronization based on time stamps and which operate to a standard other than IEEE 802.11. The terms 'group' and 'domain' are used interchangeably herein to refer to a collection of wireless stations, with different groups/domains running with different timing clocks, irrespective of the standards and protocols used by those stations. The term 'group' does not limit the methods described to Wi-Fi™ Direct and the term 'domain' does not limit the methods described to replicating time stamps between groups of wireless stations which use different protocols/frequencies, although the methods may be used in such scenarios. In an example, the methods described herein may be used to synchronize time stamps between two Wi-Fi™ domains (or two Wi-Fi™ networks), one at 2.4 GHz and one at 5 GHz, where each domain (or network) suffers different processing delays as the frames used to transmit the time stamps (e.g. the beacon frames) in the 5 GHz band (e.g. for IEEE 802.11n and more advanced transmission schemes) may be larger. In other examples, the methods described herein may be used to synchronize time stamps between groups operating on different channels within the same frequency band (e.g. channel 1 to channel 14 within the 2.4 GHz frequency band).

FIG. 1 is a schematic diagram showing a wireless network 100, which may be a Wi-Fi™ network. The wireless network 100 comprises a number of domains 101-103, denoted domain A 101, domain B 102 and domain C 103. Where this is a Wi-Fi™ network, these domains may be Wi-Fi™ Direct groups. Each domain 101-103 comprises a master STA 104-106 and one or more slave STAs 108. It will be appreciated that a wireless station may be capable of acting as both a master and a slave STA and the labels applied in FIG. 1 relate to a wireless station's current role, rather than the capabilities of each station. The wireless network 100 shown in FIG. 1 also comprises an access point AP 110 which generates the frames comprising the original time stamp (TS) and may therefore be referred to as the 'time keeper' within the network 100. It will be appreciated that in some examples, the frames comprising the original time stamp may instead be generated by a master STA (e.g. master STA A 104 may act as the time keeper).

Figure 6:
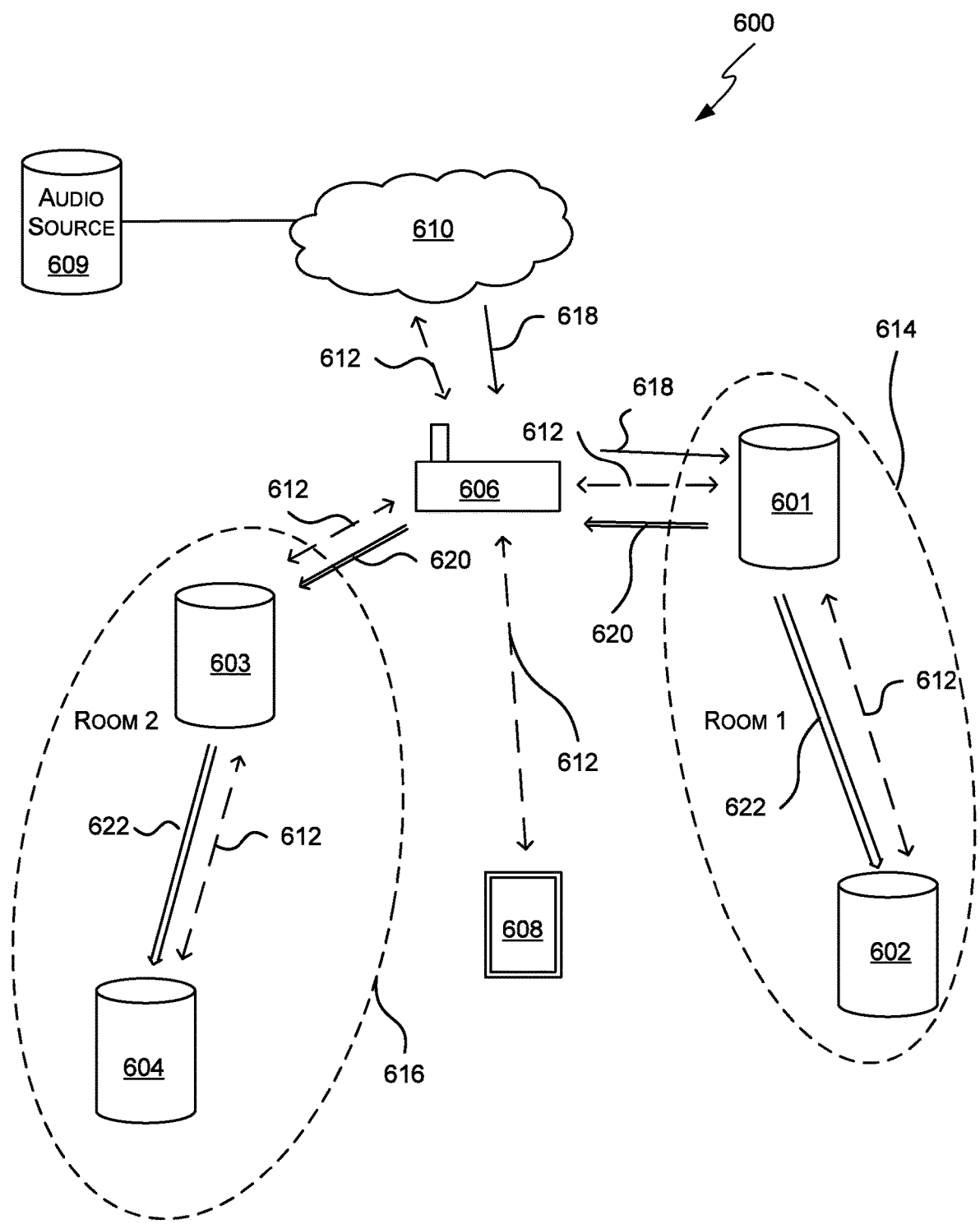
FIG. 6 shows a schematic diagram of another example wireless network.
Figure 7:
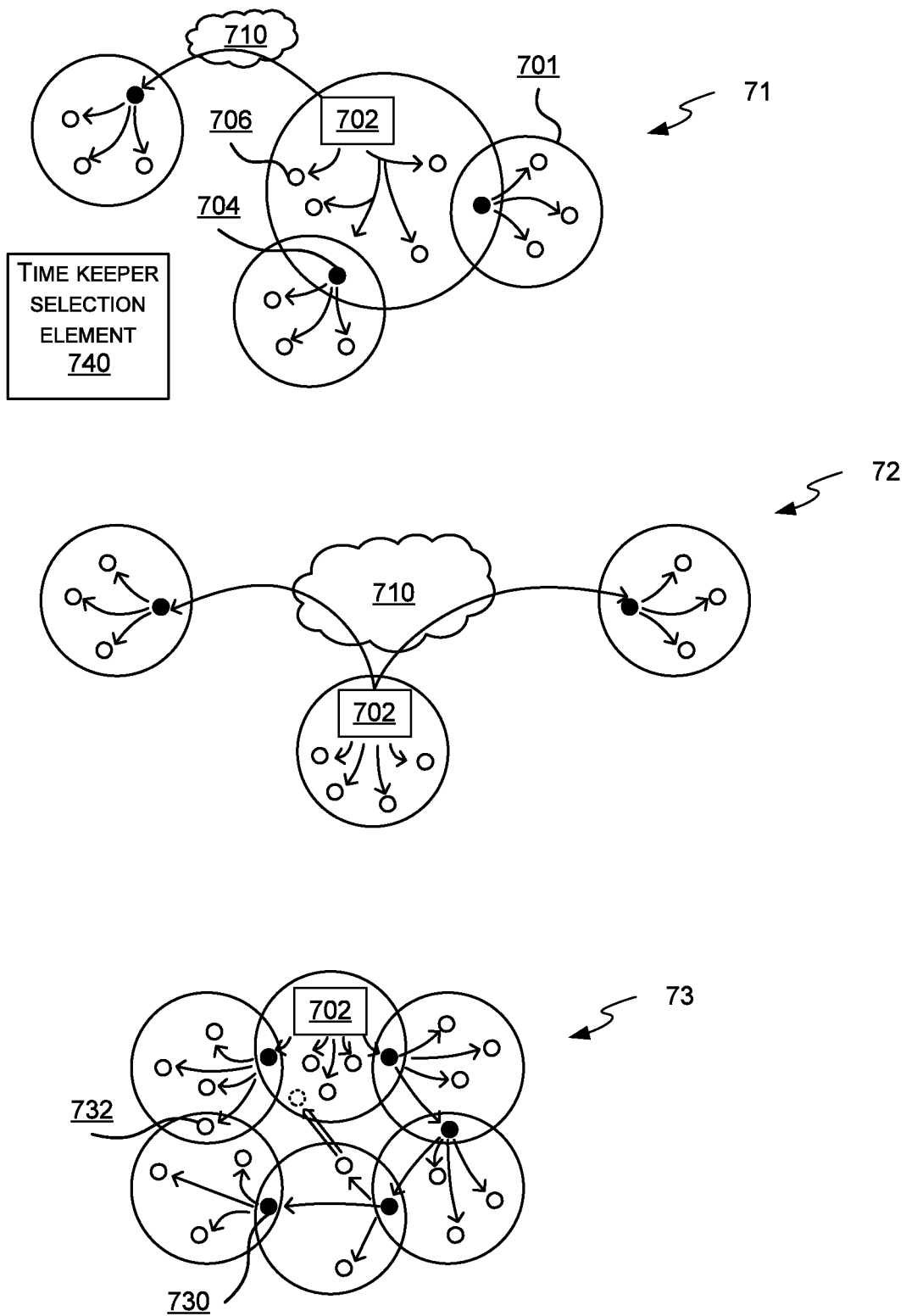
FIG. 7 shows schematic diagrams of further example wireless networks which each comprise multiple domains.

All the slave STAs 108 in domain A 101, receive the frames broadcast by the AP 110 which comprise the original time stamp (as indicated by arrows 112) and use the time stamps received to synchronize themselves to the AP 110 (e.g. using one of the methods described above). Additionally, master STA B 105, in domain B 102 receives the original time stamps (as indicated by arrow 114). The master STA B 105 may be within range of the AP 110 such that it also wirelessly receives the frames broadcast by the AP 110 which comprise the original time stamp (as shown in FIG. 1, as the master STA B 105 is shown in an overlapping region between domain A 101 and domain B 102) or alternatively, the master STA B 105 may receive the time stamps by another route (e.g. via a wired network from AP 110). Master STA B 105 uses the time stamps received from the AP 110 to replicate the time stamps before re-broadcasting them (in frames) to slave STAs 108 within domain B 102 (as indicated by arrows 116). Similarly, master STA C 106 may be within range of the AP 110 such that it receives the frames broadcast by the AP 110 which comprise the original time stamp or within range of master STA B 105 (as shown in FIG. 1, as the master STA C 106 is shown in an overlapping region between domain B 102 and domain C 103) or the master STA C 106 may receive the time stamps by another route (e.g. from AP 110, as indicated by arrow 118, via another network such as a wired network). Master STA C 106 uses the time stamps received from the AP 110/master STA B 105 to replicate the time stamps before re-broadcasting them (in frames) to slave STAs 108 within domain C 103 (as indicated by arrows 120). It will be appreciated that although FIG. 1 shows a linear arrangement of domains (such that B connects to A and C connects to B), the domains may be arranged in any manner and further examples are shown in FIGS. 6 and 7.

The access point AP 110 and the wireless stations 104-106, 108 within the wireless network 100 may be computing-based devices such as desktop computers, laptop computers, tablet computers, smart phones, digital radio, smart TV, games consoles, media players, etc. In some examples a wireless station 104-106, 108 may be capable of functioning as an AP and so the AP 110 may be a wireless station 104-106, 108 which is currently acting as AP (e.g. a master node in a Wi-Fi™ system which is acting as AP). In other examples, the AP 110 may be a dedicated wireless networking device that acts as an AP and may include additional networking functionality (e.g. it may also act as a router) but may not be capable of more general or non-networking functions. In various examples, the AP 110 and/or a wireless station 104-106, 108 may be a wireless speaker.

Figure 2:
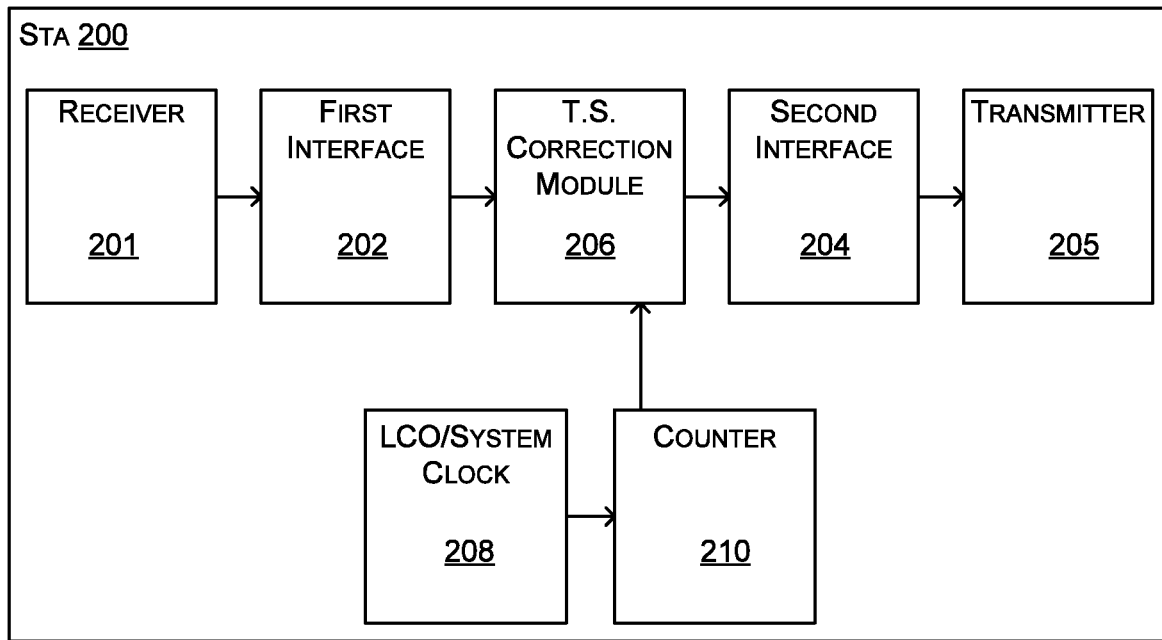
FIG. 2 shows a schematic diagram of an example master wireless station.
Figure 3:
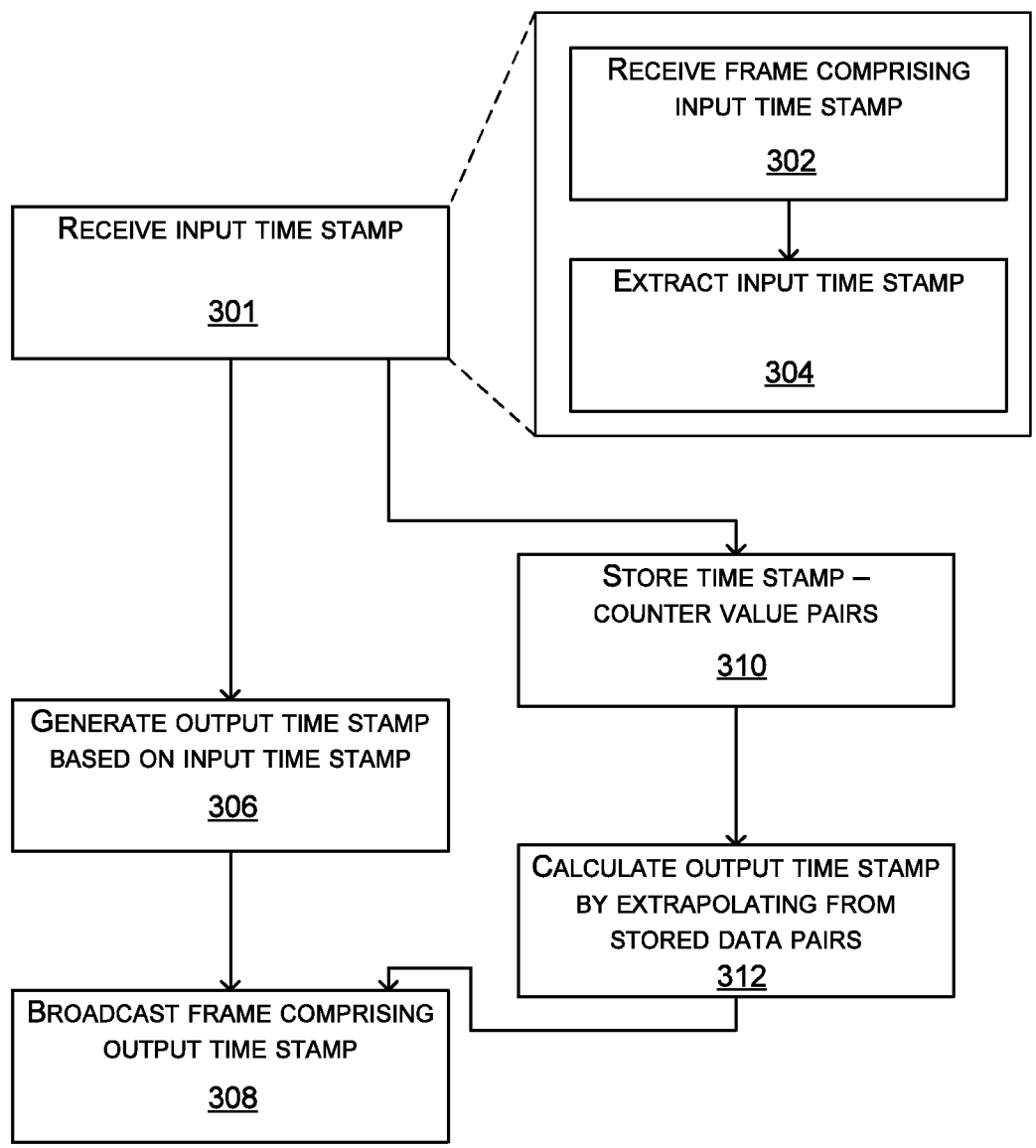
FIG. 3 is a flow diagram of an example method of operation of a master wireless station, such as shown in FIG. 2.

The operation of a master STA which re-broadcasts time stamps can be described with reference to FIGS. 2 and 3. FIG. 2 shows a schematic diagram of an example master STA 200 and FIG. 3 is a flow diagram of an example method of operation of a master STA, such as shown in FIG. 2. The master STA 200 comprises two communication interfaces 202, 204 and is arranged to receive frames via a receiver 201 and the first interface 202 and to broadcast frames via the second interface 204 and transmitter 205. The second interface 204 is a wireless interface which is used to broadcast frames (via wireless transmitter 205) comprising a time stamp ($TS_{out}$) to slave STAs within its domain. The first interface 202 may be a wireless interface (e.g. such that the master STA can receive frames wirelessly from either a master STA in another domain or from an AP, as shown in FIG. 1) or may be a wired interface and hence the receiver 201 may be a wired or wireless receiver. In various examples, the first interface 202 may be a Wi-Fi™ interface or a wired interface (e.g. a wired interface which uses similar packetization and management frames to Wi-Fi™). In various examples, the second interface 204 may be a Wi-Fi™ interface. In various examples, the first and second interfaces 202, 204 may be the same interface which switches between receiving frames (via receiver 201) and transmitting frames (via transmitter 205). In various examples, the first and second interfaces 202, 204 may both be wireless interfaces (e.g. they may both be Wi-Fi™ interfaces) but may use different frequencies (e.g. one may use 2.4 GHz and the other may use 5 GHz) or different physical channels within the same frequency band.

As shown in FIG. 3, the master STA 200 receives a time stamp (block 301), referred to herein as the input time stamp, $TS_{in}$. In various examples, the time stamp is received within a frame via the receiver 201 and first interface 202 (block 302) and the first interface 202 extracts the input time stamp from the frame (block 304). The master STA then generates an output (or replicated) time stamp, $TS_{out}$, based on the input time stamp (block 306) and then broadcasts a frame comprising the output time stamp to associated stations in its domain via the second interface 204 and transmitter 205 (block 308). In some examples, $TS_{in}=TS_{out}$; however, in many examples, the master STA 200 further comprises a time stamp correction module 206 and $TS_{in} \neq TS_{out}$.

The generation of the output time stamp (in block 306) may comprise applying a correction, $\Delta TS$, to the input time stamp in the correction module, where the correction compensates for any delay within the master STA 200 between receiving the frame comprising the input time stamp (in block 302) and broadcasting the frame comprising the output time stamp (in block 308). These delays may for example be processing delays and/or network stack delay. The time stamp correction module 206 may therefore predict the current value of the time stamp at the receiver at the time the time stamp is re-broadcast from the transmitter. In some examples, the correction, $\Delta TS$, may be explicitly calculated and then added to the input time stamp to generate the output time stamp; however in other examples, the correction, $\Delta TS$, is not explicitly calculated when generating the output time stamp.

There are a number of ways in which the output time stamp, $TS_{out}$ and/or correction, $\Delta TS$, may be calculated by the correction module 206 and/or by other parts of the master STA (in block 306) and in various examples, the output time stamp and/or correction may be calculated with reference to a clock within the master STA, such as a local oscillator or system clock 208 (which may also be referred to as a common event clock and may operate a much higher frequency than the physical layer clock). The system clock may, for example, be implemented as a software control loop within a system on chip (SoC) and is accessible by all parts of the SoC. In such an example, the first interface 202 stores a pair of values each time a time stamp is received by the first interface 202 (block 310). The pair of values comprises the time stamp value received and the value of a counter 210 (which increments at the same rate as the local oscillator/system clock 208) at the time the time stamp value was received. These stored data pairs are then used (e.g. by the correction module 206) to generate the output time stamp by extrapolating from known data points corresponding to stored pairs (block 312). This can be described with reference to FIG. 4.

Figure 4:
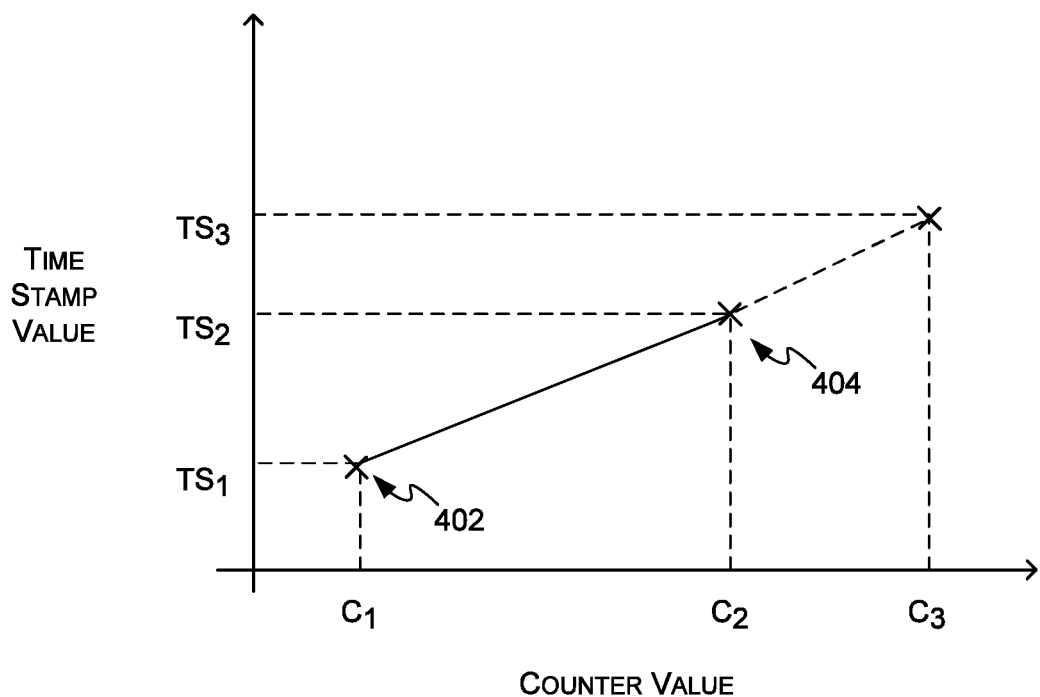
FIG. 4 is a graph which demonstrates how an output time stamp may be generated by extrapolating from data pairs.

FIG. 4 shows a graph with counter values the x-axis and time stamp values on the y-axis. Given two stored data pairs $\{C_1, TS_1\}$ and $\{C_2, TS_2\}$ (indicated by arrows 402, 404), if the value of the counter 210 at the time the output time stamp is generated has a value $C_3$, then by extrapolating from the stored data pairs, the output time stamp is generated having the value $TS_3$. In this example, referring back to the previously used notation, $TS_{in}=TS_2$, $TS_{out}=TS_3$ and $\Delta TS=TS_3-TS_2$. Although FIG. 4 shows a method which calculates $TS_{out}$ without first explicitly calculating $\Delta TS$, it will be appreciated that the extrapolation could use correction values (rather than actual TS values) and explicitly calculate the correction value which is applied to the input time stamp.

The correction of the time stamp (in block 306) may also be performed in other ways. In another example, the input time stamp ($TS_{in}$) may be used to overwrite a local counter driven by a local oscillator and the value of the output (or replicated) time stamp ($TS_{out}$) may generated based on the value of the local counter at the time the frame is (or predicted to be) broadcast. This local counter may be referred to as a 'self-maintained local time stamp counter'. In order to increase the accuracy of the local counter, in various examples, prior to overwriting the value of the local counter, an error between the input time stamp value ($TS_{in}$) and the current value of the counter is calculated. This error can then be used to adjust the rate of the counter in the receiving station (i.e. such that there is not necessarily a fixed relationship between a tick of the local oscillator and an increment of the counter). For example, through knowledge of the time elapsed since a previous correction (e.g. in response to receiving the previous frame comprising a time stamp), the amount of drift between the local counter and the master time stamp can be determined. A rate adjustment unit (which may be implemented using a phase locked loop) may then be used to increment the local counter at a rate much closer to the rate of master time stamp. By repeating this drift determination and adjustment of the rate adjustment unit each time a new time stamp is received, the error tends towards a minimum value over a short period of time.

The methods described herein may be used in combination with other methods of maintaining clocks (e.g. using methods defined in IEEE 802.11v). In such an example, another standard method (such as IEEE 802.11v) may be used to maintain the clocks in domains which are capable of operating to that standard and the time stamp replication methods described herein may be used to replicate the time into domains which are not capable of operating to that standard (e.g. non IEEE 802.11v domains).

Figure 5:
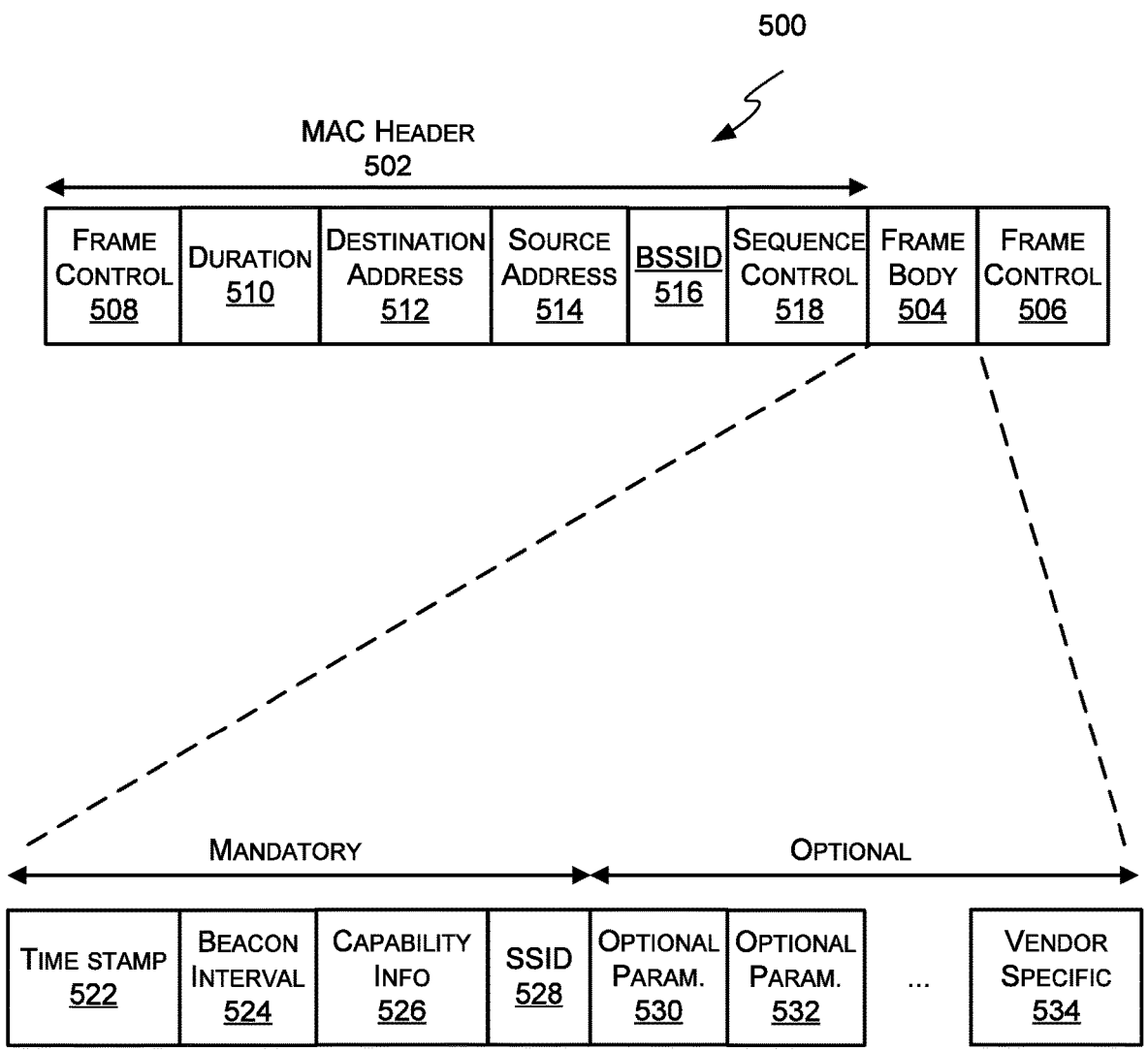
FIG. 5 shows a schematic diagram of the format of an example beacon frame.

As described above, in various examples, the wireless network 100 may be a WiFi™ network and in which case the time stamps may be broadcast within beacon frames. FIG. 5 shows a schematic diagram of the format of an example beacon frame 500. In this example, the beacon frame is as defined by the Wi-Fi™ standard, although as described above, the methods described herein are not limited to use with Wi-Fi™ and may be used with other wireless standards. The beacon frame 500 shown is an example of an IEEE 802.11 management frame and to ensure that all access points and stations in a Wi-Fi™ network can properly identify management frames they have a standard frame format shown in the upper part of FIG. 5, with different management frames having a different format for the frame body portion 504, which is shown in more detail for a beacon frame in the lower part of FIG. 5.

The part of the beacon frame 500 which is common to all management frames comprises a MAC (Media Access Control) header portion 502, a frame body portion 504, and a frame control portion 506. The MAC header portion 502 comprises a frame control field 508, a duration field 510, a destination address field 512, a source address field 514, a Basic Service Set Identification (BSSID) field 516, and a sequence control field 518. As is known to those of skill in the art a single access point together with all associated stations is called a Basis Service Set (BSS). The access point acts as master to the stations within that BSS. Each BSS is identified by a BSSID. In an infrastructure BSS, the BSSID is the MAC address of the access point.

According to the IEEE 802.11 standard, the frame body portion 504 of a beacon frame comprises a time stamp field 522, a beacon interval field 524, a capability information field 526, and an SSID field 528. The time stamp field 522 comprises the value of the timing synchronization function (TSF) time of the device that transmitted the beacon frame. The beacon interval field 524 comprises the time interval between beacon frame transmissions of the transmitting device expressed in time units (TUs). The capability field 526 comprises the information about the capability of the network and/or device. It may include information, such as, but not limited to, the mode of operation (ad hoc or infrastructure), support for polling, encryption etc. The SSID information element 528 specifies the SSID or SSIDs used by the transmitting device. As is known to those of skill in the art an SSID is a sequence of alphanumeric characters (letter or numbers) that uniquely defines a Wi-Fi™ network. All access points and stations attempting to connect to a specific Wi-Fi™ network use the same SSID.

The frame body 504 of a beacon frame may optionally also comprise one or more optional fields 530, 532, 534. Optional fields may comprise, but are not limited to, a supported rates field, a frequency-hopping (FH) parameter set field, a direct-sequence (DS) parameter set field, a contention-free (CF) parameter set field, an IBSS parameter set field, a traffic indication map (TIM) field, and a vendor specific field 534 (which may be used to carry information not defined in the IEEE 802.11 standards). The IEEE 802.11 standards specify the order in which the optional fields are to be placed in the frame body 504. In particular, the IEEE 802.11 standards specify that the vendor specific field 534 is to be the last field in the frame body 504 of a beacon frame.

Where the wireless network 100 is a Wi-Fi™ network, each subsequent domain 102, 103 (i.e. those domains which do not receive beacon frames directly from the AP 110) may be a Wi-Fi™ Direct Group with the STA slaves 108 in those groups being peer-to-peer (P2P) clients and the STA masters 105, 106 in the subsequent domains being P2P Group Owners (P2P GOs).

FIG. 6 shows a schematic diagram of another wireless network 600 in which the methods described herein may be implemented. The wireless network 600 comprises a plurality of wireless speakers 601-604 (or other media playback devices), an access point 606 and a control point 608. The control point (CP) 608 provides control data for the wireless network and may, for example, be an application running on a smart phone or other computing device. In this example, audio data is streamed from a remote source 609, for example via the internet or other network 610.

Using the control point 608, a user is able to control the operation of the wireless network 600, e.g. to browse content (e.g. to select tracks to be played), control playback (e.g. by pausing, fast forwarding, etc.) and select speakers on which content is to be played. Based on the selected speakers (e.g. speakers 601-604) and their connectivity and capabilities, one or more masters are designated. In the example shown in FIG. 6, two masters are designated: the session master 601 in room 1 (as indicated by the dashed area 614) and a local master 603 in room 2 (as indicated by the dashed area 616). Two masters are used because of the arrangement of the speakers 601-604 which means that there is no single speaker that can communicate directly with all the other speakers. Control data (indicated by dashed arrows 612) is distributed throughout the network 600 from the control point via the session master 601 and AP 606.

The session master 601 retrieves the audio stream from the remote source 609 via the network 610 and access point 606 (as indicated by solid arrows 618) and adds time stamps to the audio stream. The time stamped audio stream is sent from the session master 601 to the local master 603 in room 2 via the AP 606 (indicated by arrows 620) and then each slave speaker 602, 604 streams audio data direct from their local masters (i.e. the master with whom they have direct communications), such that speaker 602 streams the time stamped audio stream from session master 601 and speaker 604 streams the time stamped audio stream from the local master 603 (indicated by dashed arrows 622).

In order that the speakers in room 2 can use the time stamped audio stream generated by the session master 601 (i.e. in order that there is only one resource master which adds time stamps to the data), the methods described herein are used to ensure that the two rooms are part of the same time zone. In this example configuration, both masters 601, 603 receive frames from the AP 606 comprising the original time stamps. Both masters 601, 603 replicate and re-broadcast the time stamps (e.g. using the method shown in FIG. 3) such that the re-broadcast time stamps are in lock-step with (i.e. synchronized to) the original time stamps generated by the AP 606.

FIG. 7 shows schematic diagrams of further wireless networks 71-73 which each comprise multiple domains 701. Each domain comprises a master which broadcasts frames including a time stamp (e.g. beacon frames) and any master which does not receive the original time stamps acts as a bridge and replicates and re-broadcasts frames comprising time stamps which are synchronized with the original time stamps. In the diagrams in FIG. 7, the device which broadcasts the frames comprising the original time stamps (and hence acts as time keeper) is depicted by a rectangle 702 (where this may be a master STA or an AP), master STAs which act as a bridge are depicted by a black circle 704 and slave STAs are depicted as an unfilled circle 706.

In the first example network 71 in FIG. 7, there are two master STAs which receive the frames comprising the original time stamps wirelessly and one master STA which receives the original time stamps via an alternative means (e.g. via another network 710). The domain which is not shown as overlapping with the other domains may be geographically co-located with the other domains (e.g. it may represent another room within the same building or an area outside a building with the overlapping domains representing rooms within a building) or it may be geographically separated from the other domains. In the second example network 72, each of the master STAs which do not broadcast the original time stamps receive the original time stamps via another network 710. The third example network 73 shows a more meshed network where there is significant overlap between domains and more than one wireless station that could act as a master within any domain. This means that should the master STA 73 be moved, switched off by a user or fail, one of the slave STAs 732 could become master and start replicating and re-broadcasting time stamps which are in lock-step with the original time stamps. Similarly, if a user re-arranges the stations such that slave STA 734 is moved to the position marked by a dotted circle 736 (as indicated by the double arrow), it switches domains but as it is already synchronized to the original time stamps (broadcast by STA 702), it can continue to operate without any delay while it becomes synchronized to its new master.

As shown in the first example network 71, a network may further comprise a time keeper selection element 740 which is arranged to select one of the masters within the network to be the time keeper (e.g. the strongest master) and hence generate the original time stamps. The time keeper selection element 740 may use one or more parameters to make the selection (e.g. the robustness of signal strength, the range of broadcasts generated by a master, the resources of the wireless station, signal quality, the effective bit error rate as determined by the bit error rate and speed negotiation algorithms, etc.). In an example, a newer wireless station that offers both 2.4 GHz and 5 GHz interfaces may be selected as time keeper ahead of an older wireless station that only offers a 2.4 Ghz interface. The time keeper selection element 740 may operate dynamically such that the time keeper changes as the network conditions or arrangement of wireless stations change. Upon switching time keeper, there may be a hand-over process between the old time keeper and the new time keeper.

The methods of time stamp replication described herein may be used each time a frame comprising a time stamp (e.g., an input time stamp) is received by a master STA. The more frequently the time stamps are broadcast, the less jitter there is and the absolute timing errors between STAs are smaller; however, the frames consume bandwidth. In a system which requires high data flow but which can accommodate less accuracy in timing synchronization, the frames comprising the time stamps may be broadcast less frequently. In various examples this may be implemented dynamically with the frequency of time stamp broadcast being adjusted in order that the accuracy and/or data flow remains within predefined ranges.

Figure 8:
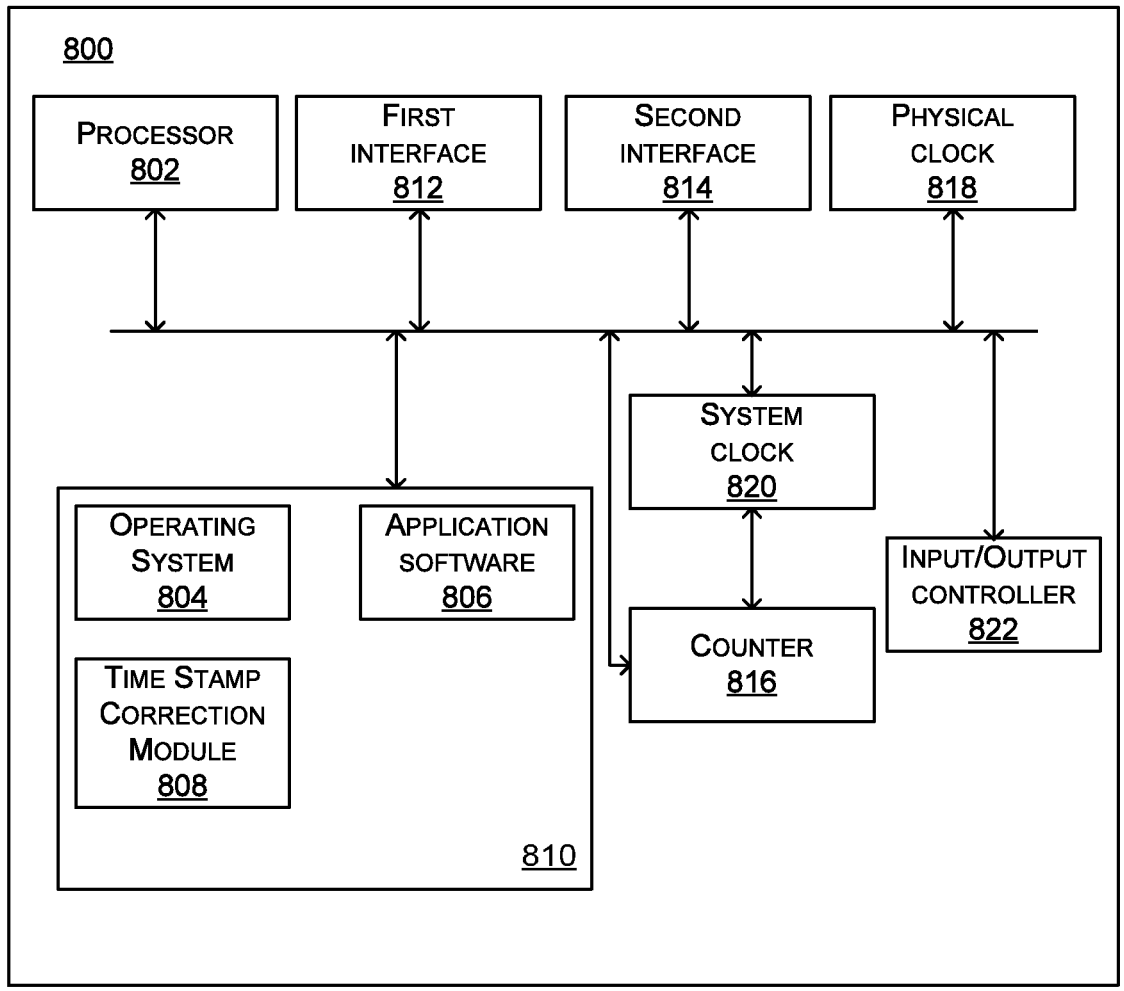
FIG. 8 illustrates various components of an exemplary computing-based device which may operate as a wireless station which replicates and re-broadcasts time stamps.

FIG. 8 illustrates various components of an exemplary computing-based device 800 which may be implemented as any form of a computing and/or electronic device, and which may operate as a wireless station which replicates and re-broadcasts time stamps, as described above.

Computing-based device 800 comprises one or more processors 802 which may be microprocessors, controllers or any other suitable type of processors for processing computer executable instructions to control the operation of the device in order to operate as a wireless station. In some examples, for example where a system on a chip architecture is used, the processors 800 may include one or more fixed function blocks (also referred to as accelerators) which implement a part of the method of operation in hardware (rather than software or firmware), e.g. the correction of the time stamp. Platform software comprising an operating system 804 or any other suitable platform software may be provided at the computing-based device to enable application software 806, 808 to be executed on the device. This application software may, for example, comprise a time stamp correction module 806 where this is implemented in software rather than in hardware. The application software may comprise a module which generates time stamp—counter value pairs, where this is done separately from the time stamp correction (alternatively this may be implemented in hardware within the computing-based device 800).

The computer executable instructions may be provided using any computer-readable media that is accessible by computing-based device 800. Computer-readable media may include, for example, computer storage media such as memory 810 and communications media. Computer storage media (i.e. non-transitory machine readable media), such as memory 810, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 810) is shown within the computing-based device 800 it will be appreciated that the storage may be distributed or located remotely and accessed via a network or other communication link (e.g. using one or communication interfaces 812, 814). The memory 820 may be used to store time stamp—counter value pairs for use in replicating the original time stamp, where the counter value may be the value of counter 816 which increments based on the physical layer clock 818 or the system clock 820 (as shown in FIG. 8).

The computing-based device 800 is shown comprising two communication interfaces 812, 814 although as described above, in some examples a single communication interface may be used. The computing-based device 800 receives frames via the first interface 812 and broadcasts frames via the second interface 814 and these two interfaces may use the same communication protocol or different protocols. In some examples, both interfaces may be within the same silicon chip.

The computing-based device 800 may comprise one or more clocks, such as a physical layer clock 818 and/or a system clock 820. Each of these clocks may comprise a counter (e.g. counter 816) and either or both of these counters may be reset and/or rate adjusted based on a time stamp received in order to synchronize the computing-based device with other wireless stations.

The computing-based device 800 may also comprise an input/output controller 822 arranged to output display information to a display device (which may be separate from or integral to the computing-based device) and to receive and process input from one or more devices, such as a user input device (e.g. a button, a mouse or a keyboard), etc.

The methods described above may be used to synchronize different domains within a wireless network, where slave wireless stations in a domain receive time stamps from a master wireless station (or AP) within the domain. In only one of the domains do the slave wireless stations receive the original time stamps. In the other domains, the time stamps received by a slave wireless station have been replicated by the master wireless station, which acts as a bridge between domains. The master station may receive the original time stamps or time stamps replicated by another master station and the time stamps may be received wirelessly or via a wired link. As a result of the synchronization between domains, time stamped data (e.g. audio data) may be reused across domains and in various examples, the time stamped data may be generated in a different domain to the wireless station which generates the original time stamps. Furthermore, the synchronization between domains makes the network easier and quicker to reconfigure and/or recover after a failure of a master wireless station.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The term 'subset' is used herein to refer to a proper subset, such that a subset does not comprise all the members of the set.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

What is claimed is:

1. A method comprising:
  receiving an input time stamp at a wireless station in a wireless network, the wireless network comprising a plurality of groups of wireless stations, each group running with a different timing clock;
  calculating an error between the value of the input time stamp and the value of a local counter driven by a local oscillator;
  using the input time stamp to overwrite the local counter;
  generating an output time stamp based on the value of the local counter at a time a frame comprising the output stamp is predicted to be transmitted; and
  transmitting the frame comprising the output time stamp to a further wireless station within the wireless network.

2. The method according to claim 1, wherein receiving an input time stamp comprises:
  receiving a frame comprising an input time stamp.

3. The method according to claim 2, wherein the frame comprising an input time stamp is received via a first communication interface and the frame comprising the output time stamp is transmitted via a second communication interface.

4. The method according to claim 2, wherein the frame comprising an input time stamp is received via a first communication interface and the frame comprising the output time stamp is transmitted via a second communication interface, and wherein the wireless station comprises a single communication interface which operates as both the first and second communication interfaces.

5. The method according to claim 2, wherein the frame comprising an input time stamp is received via a first communication interface and the frame comprising the output time stamp is transmitted via a second communication interface, and wherein the second communication interface is a wireless interface.

6. The method according to claim 2, wherein the frame comprising an input time stamp is received via a first communication interface and the frame comprising the output time stamp is transmitted via a second communication interface, and wherein the first communication interface is a wireless interface.

7. The method according to claim 2, wherein the frame comprising an input time stamp is received via a first communication interface and the frame comprising the output time stamp is transmitted via a second communication interface, and wherein the first communication interface is a wired interface.

8. The method according to claim 1, further comprising determining an amount of drift between the rate of the local counter and a master time stamp based on the elapsed time since a previous adjustment.

9. The method according to claim 1, further comprising overwriting the local counter each time an input stamp is received.

10. The method according to claim 1, wherein the input time stamp is an original time stamp generated by an access point in the wireless network.

11. The method according to claim 1, wherein the input time stamp is a time stamp received from a master station and generated by the master station based on an input time stamp received by the master station.

12. The method according to claim 11, wherein the input time stamp received by the master station is an original time stamp generated by an access point in the wireless network.

13. The method according to claim 1, wherein the frames are beacon frames.

14. The method according to claim 1, wherein the wireless station is a Wi-Fi™ station.

15. The method according to claim 1, wherein the wireless station is a wireless speaker.

16. A non-transitory computer readable storage medium having stored thereon a computer readable dataset description of an integrated circuit that, when processed, causes a layout processing system to generate a circuit layout description used in an integrated circuit manufacturing system to manufacture a device comprising:
- a local counter driven by a local oscillator;
- a first communication interface arranged to receive an input time stamp; and
- a second communication interface arranged to transmit an output time stamp to a further wireless station, wherein the further wireless station runs with a different timing clock,
- wherein the output time stamp is generated by overwriting the local counter and generating the output time stamp based on a value of the local counter at a time the output time stamp is predicted to be transmitted; and
- wherein the wireless station further comprises a rate adjustment unit arranged to calculate an error between a value of the input time stamp and the value of the local counter, prior to overwriting the local counter.

17. A wireless station comprising:
- a local counter driven by a local oscillator;
- a first communication interface arranged to receive an input time stamp; and
- a second communication interface arranged to transmit an output time stamp to a further wireless station, wherein the further wireless station runs with a different timing clock,
- wherein the output time stamp is generated by overwriting the local counter and generating the output time stamp based on a value of the local counter at a time the output time stamp is predicted to be transmitted; and
- wherein the wireless station further comprises a rate adjustment unit arranged to calculate an error between a value of the input time stamp and the value of the local counter, prior to overwriting the local counter.

18. A wireless network comprising at least one wireless station as set forth in claim 17, the at least one wireless station comprising:
- a local counter driven by a local oscillator;
- a first communication interface arranged to receive an input time stamp; and
- a second communication interface arranged to transmit an output time stamp to a further wireless station, wherein the further wireless station runs with a different timing clock,
- wherein the output time stamp is generated by overwriting the local counter and generating the output time stamp based on a value of the local counter at a time the output time stamp is predicted to be transmitted; and
- wherein the wireless station further comprises a rate adjustment unit arranged to calculate an error between a value of the input time stamp and the value of the local counter, prior to overwriting the local counter.

19. The wireless network according to claim 18, wherein:
- the second communication interface is arranged to transmit the output time stamp to wireless stations in one of a plurality of groups in a wireless network, each group running with a different timing clock; and
- the rate adjustment unit is further arranged to adjust a rate of the local counter based on the error, prior to overwriting the local counter.

20. The wireless network according to claim 19, further comprising:
- a plurality of wireless stations as set forth in claim 17; and
- a time keeper selection element arranged to dynamically select a wireless station from the plurality of wireless stations to act as time keeper and generate original time stamps.

* * * * *

UNITED STATES PATENT AND TRADEMARK OFFICE
CERTIFICATE OF CORRECTION

Page 1 of 1

PATENT NO. : 11,228,388 B2
APPLICATION NO. : 16/905808
DATED : January 18, 2022
INVENTOR(S) : Ian R. Knowles It is certified that error appears in the above-identified patent and that said Letters Patent is hereby corrected as shown below:

On the Title Page

On page 2 please add:
(30)    Foreign Application Priority Data
May 9, 2014 (GB) .............................. 1408250.7

Signed and Sealed this
Twelfth Day of April, 2022

Drew Hirshfeld
*Performing the Functions and Duties of the
Under Secretary of Commerce for Intellectual Property and
Director of the United States Patent and Trademark Office*